F. R. HOYT.
SELF CONTAINED HIGH TENSION BATTERY IGNITION UNIT.
APPLICATION FILED APR. 28, 1916.
1,216,125.
Patented Feb. 13, 1917.
2 SHEETS—SHEET 1.
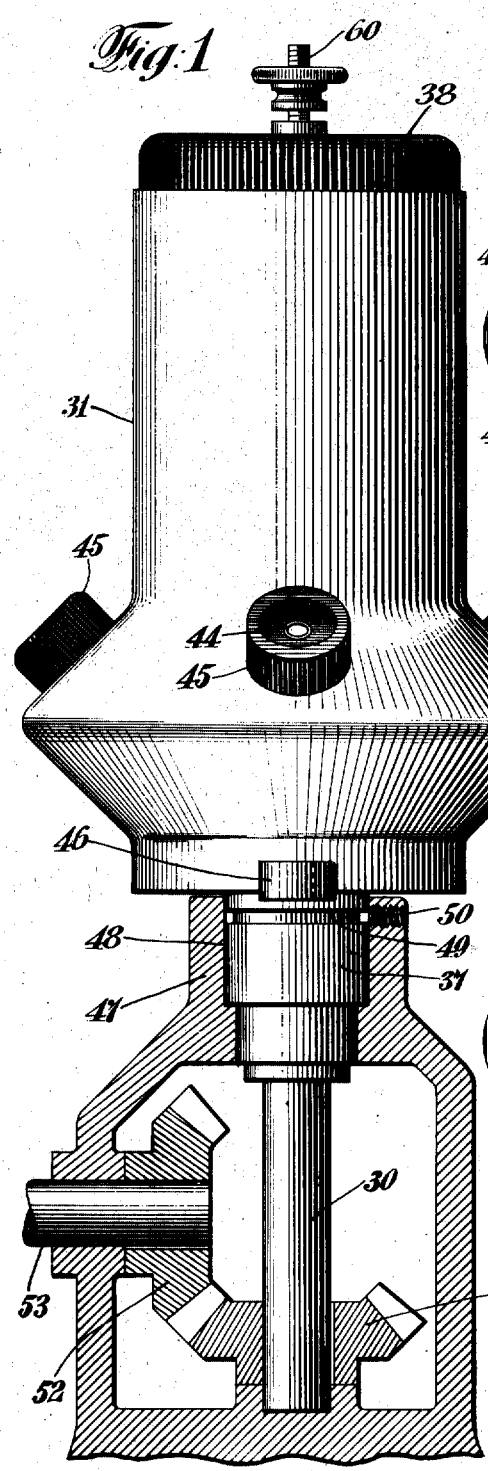
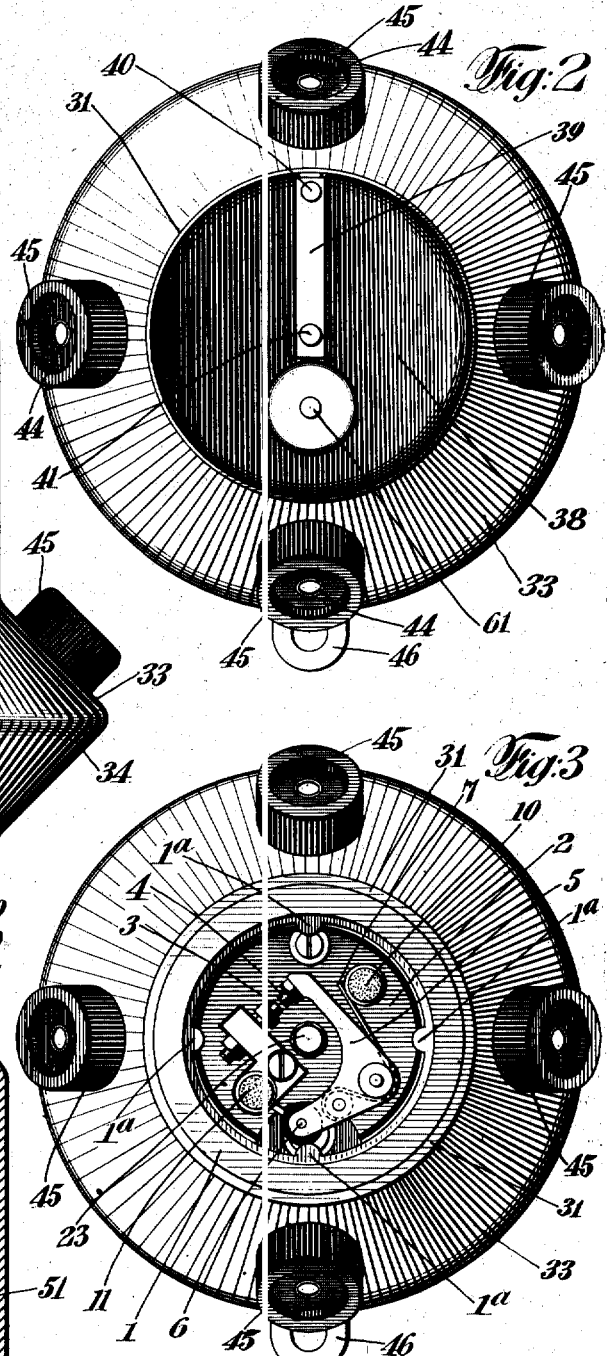

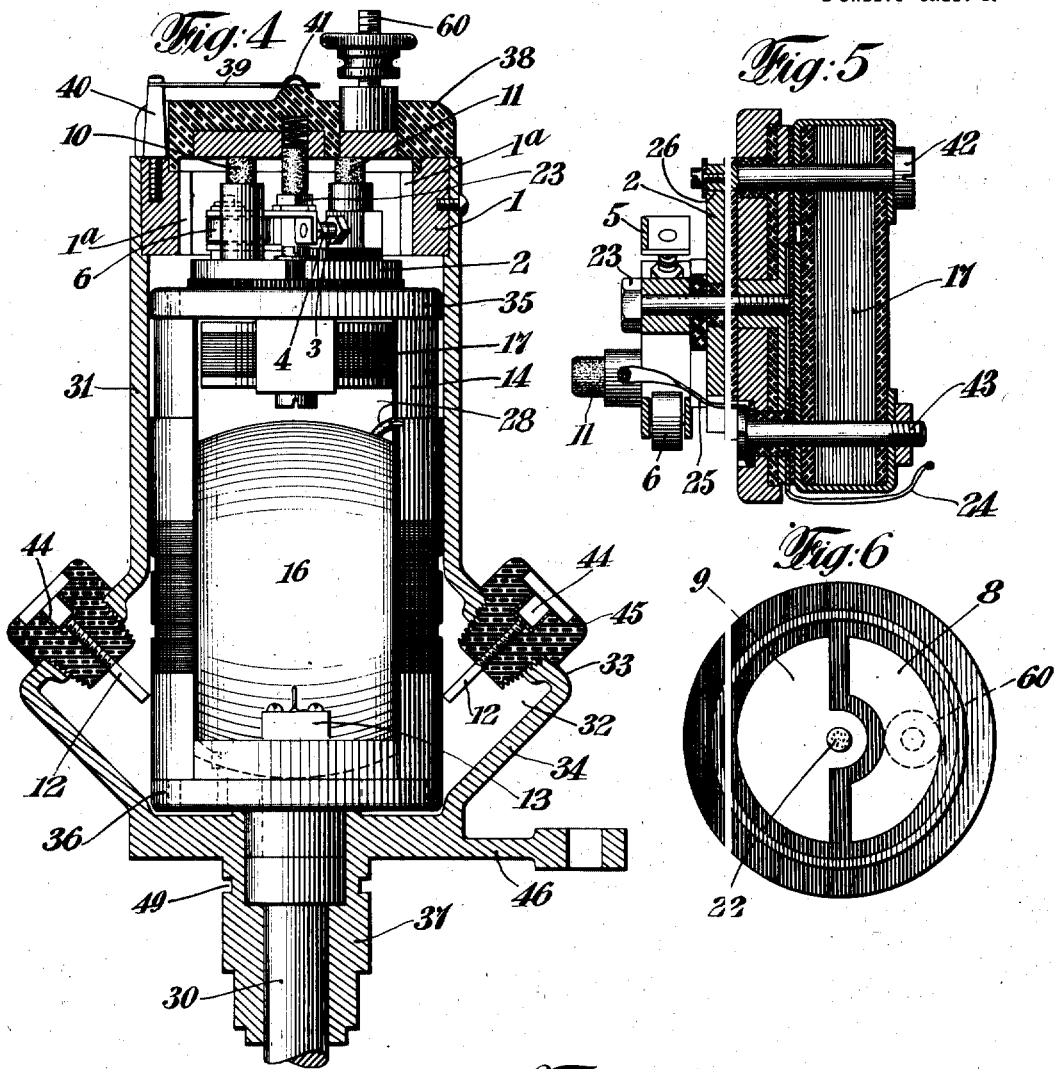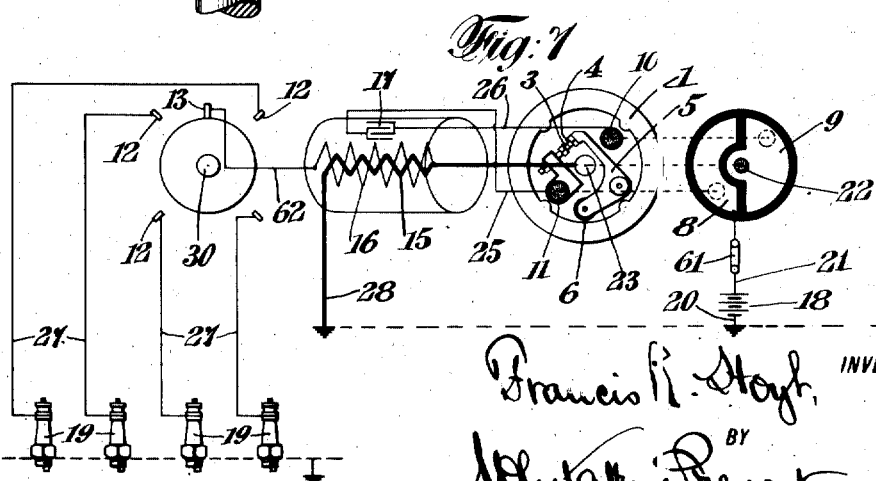

UNITED STATES PATENT OFFICE.

FRANCIS R. HOYT, OF EAST ORANGE, NEW JERSEY, ASSIGNOR TO THE SIMMS MAGNETO COMPANY, OF EAST ORANGE, NEW JERSEY, A CORPORATION OF NEW YORK.

SELF-CONTAINED HIGH-TENSION BATTERY IGNITION UNIT.

1,216,125.

Specification of Letters Patent.

Patented Feb. 13, 1917.

Application filed April 28, 1916. Serial No. 94,100.

*To all whom it may concern:*

Be it known that I, FRANCIS R. HOYT, a citizen of the United States, residing at East Orange, in the county of Essex and State of New Jersey, have invented certain new and useful Improvements in Self-Contained High-Tension Battery Ignition Units; and I do hereby declare the following to be a full, clear, and exact description of the invention, such as will enable others skilled in the art to which it appertains to make and use the same.

My invention consists in the novel features hereinafter described reference being had to the accompanying drawings which show one form in which I have contemplated embodying my invention selected by me for the purpose of illustrating the invention, and the said invention is fully disclosed in the following description and claims.

In the said drawings:

Figure 1 is an elevation, partly in section, showing one physical embodiment of my present invention together with one form of means for supporting and operating the same.

Fig. 2 is a top plan view of the unit shown in Fig. 1.

Fig. 3 is a similar view with the cap or upper portion of the casing removed.

Fig. 4 is a vertical sectional view of the unit shown in Figs. 1, 2 and 3.

Fig. 5 is an enlarged detail section illustrating a portion of the apparatus, and showing the manner of supporting the condenser.

Fig. 6 is a bottom plan view of the cap or upper portion of the casing showing the commutator plates.

Fig. 7 represents a diagram of the circuits.

In battery ignition systems as ordinarily installed in connection with internal combustion engines, especially in connection with motor vehicles, it is customary to support the various parts of the apparatus at separated points more or less remote from each other. Such battery ignition systems comprise among their members a periodic interrupter, a distributer, an induction coil, a condenser and a battery, and in practice it is usual to arrange the periodic interrupter and distributer on the engine, the battery in some portion of the body of the vehicle, and the induction coil and condenser are usually mounted upon the dash board or other suitable part more or less remote from the battery and from the periodic interrupter and distributer. It follows, therefore, that a considerable amount of external wiring is necessary to connect the various parts of the system operatively and these wires are subjected to considerable vibration and are liable to become injured or broken while the connections of said wires with the various parts are likely to become loosened, either of which conditions tends to interrupt the operation of the engine and makes it difficult to ascertain the cause of the trouble and to effect prompt repairs. Moreover the long wires necessarily add to the internal resistance of the system and especially in the case of the condenser, which is ordinarily located at a considerable distance from the contact points of the periodic interrupter between which it is inserted, the resistance in such wires is apt to interfere in a degree with the operation of the apparatus.

One of the objects of my invention is to bring all of the parts of the system except the battery and spark plugs into a close assembled relation so as to form a unitary structure which can be assembled at the factory where all of the electrical connections between the parts can be made by the use of extremely short interior wires or connections within the unit itself, the connections being made by solder or in any other permanent manner where possible, and the entire unit being contained within a frame or casing so as to hold the parts in their assembled relation and protect them, the interior wiring and the connections between the interior wiring and the various parts.

I also prefer to provide for grounding one end of the primary winding of the induction coil through a metallic part of the apparatus in electrical connection with the engine body so that it is only necessary in installing the apparatus to connect a single wire from the battery to the ignition unit and to connect the distributer contacts with the spark plugs, thus reducing the exterior wiring to a minimum and consequently reducing to a minimum the danger of breakage of the wires or loosening of the connections. I also locate the condenser within the unit in close proximity to the contact points of the periodic interrupter and to the induction coil.

I also prefer to combine with the several elements above mentioned a commutator for reversing the direction of the primary circuit at intervals during the rotation of the rotary part of the periodic interrupter so as to prevent a transfer of metal from one contact point thereof to the other, and thus preserving and lengthening the life of the contact points and assisting in maintaining the apparatus at all times in operative condition. The periodic interrupter, the distributer and the commutator, each comprise rotary and non-rotary parts and in assembling the various parts of the apparatus in the form of a unit as above set forth, I prefer to connect all of the rotary parts of the several elements for joint rotation upon a common shaft, the said rotary parts being held in fixed relation with each other, and I also prefer to connect all of the non-rotary parts of the several elements by means of the frame or casing of the unit in fixed relation with each other and in operative relation with their coöperating rotary parts, and in order to avoid multiplicity of sliding contacts, I prefer to combine the induction coil and condenser with the rotary parts as hereinafter described.

As it is necessary to shift the non-rotary portion of the periodic interrupter with respect to the rotary portion, in a rotary direction around the axis of the rotary part, in order to advance and retard the spark, I prefer in order to accomplish this result to so construct the unit that the entire frame or casing supporting and containing the non-rotary parts shall be mounted so that the necessary oscillatory movement about the axis of rotation of the rotary parts may be imparted to it thereby enabling the advance or retard of the spark to be affected without relative movement between the non-rotary portion of the periodic interrupter and the other non-rotary devices. I also prefer to locate the periodic interrupter adjacent to one end of the frame or casing containing the parts of the unit and provide a removable cap or cover for said casing so that access may be had, by removing said cap or cover, to the contacts of the periodic interrupter for repair or adjustment when necessary.

In the accompanying drawings, I have illustrated one physical embodiment of my invention selected by me for purposes of illustration, and I will proceed to describe the same, it being understood that modifications of the said structure may be made within the scope of my invention as set forth in the claims forming part of this specification. In the accompanying drawings, 31 represents the supporting frame for the non-rotary parts of the apparatus, which is preferably in the form of a hollow shell or casing, the upper portion being cylindrical in form and the lower portion being provided with an annular recess, 32, the casing walls of which are provided with portions, 33—34, disposed angularly to each other. The periodic interrupter is herein shown as comprising a non-rotary cam ring, 1, which is fitted in an annular recessed portion at the upper or outer end of the casing, as shown in Fig. 4, and secured therein by a screw or screws, or in any other desired manner, the said cam being provided on its interior face with a plurality of inwardly extending projections, $1^a$. The rotary part of the periodic interrupter comprises, in this instance, a disk, 2, which carries the fixed contact, 3, and the movable contact, 4, the latter being mounted at a pivoted bell crank lever, 5, provided with the usual fiber heel, 6, for engaging the projections, $1^a$, of the cam ring, the bell crank being provided with the usual spring, 7, for normally holding the contacts together, see particularly Fig. 3.

The rotary part of the periodic interrupter is supported within the cam ring by a circular end plate, 35, from which it is insulated, in any desired manner, the said end plate being secured to and in this instance supported by the upper end of the core, 14, of the induction coil, the other end of the core being provided with and supported by a similar end plate, 36, which is secured to a shaft, 30, extending through an aperture in the bottom or inner end of the casing, and through an extended bearing portion, 37, advantageously provided in connection therewith.

As shown, I prefer to mount the casing vertically and to support the same from the extended bearing, 37, although this is not essential, and the apparatus may be used horizontally, if desired. As before stated, I prefer to employ in connection with my improved apparatus, a commutator for reversing the direction of the primary current through the separable contacts of the periodic interrupter, and this commutator, as shown herein, comprises a pair of carbon brushes, 10 and 11, which for convenience are mounted upon the rotary part of the periodic interrupter, and non-rotary commutator plates, 8 and 9, which, in this instance, are of segmental form, and are carried by a removable cap or cover, 38, which closes the upper or outer end of the casing and is normally held in place thereon by a spring arm, 39, pivotally connected to a stud, 40, secured, in this instance, to the cam ring, 1, and provided with a recessed portion, 41, engaging a concentric projection on the exterior of the cap or cover so that by swinging the spring arm out of engagement with the cap or cover the latter can be removed to give access to the commutator plates and brushes and the various parts of the periodic interrupters, see Figs. 3, 4 and 6. One of the commutator plates as, in this instance, the plate, 8, is provided with the binding post, 60, on the exterior of the cap, 38, to which the lead wire from the battery is connected.

The brush, 10, of the commutator is electrically connected with the movable contact and the brush, 11, is electrically connected with the fixed contact of the periodic interrupter being supported in a casing mounted on a metallic block carrying the stationary contact and insulated from the base plate, 2, of the interrupter. One of the commutator plates, in this instance, the plate, 9, is provided with a concentrically arranged brush, 22, which connects the said contact plate at all times with the primary winding of the induction coil. In this instance, the said brush is arranged to bear upon a screw, 23, extending through the end plate, 35, and the connection with the primary coil is made by means of the wire, 24, as shown in Fig. 5 or it may be connected in any other desired manner to said primary coil. The induction coil comprises as usual the primary winding, 15, the secondary winding 16, and the primary winding is grounded in a well known way as indicated at 28 by connecting it to a metallic part of the apparatus as in this instance to the core, 14.

17 indicates a condenser which is supported adjacent to one end of the induction coil in close proximity to the periodic interrupter and is electrically connected to and between the separable contacts of the interrupter in the usual manner. As indicated in Fig. 5 the condenser is secured to the end plate, 35, by screws or bolts, 42—43, which, in this instance, constitute the terminal connections of the condenser, the screw, 43, being connected by a metallic strip or wire, 25, to the block carrying the fixed contact, 3, and commutator brush, 11; and the other screw is connected through the base plate, 2, with the movable contact as indicated at 26 in Fig. 5 and in the diagram. The distributer, in this instance, comprises a rotary plate, 13, which, as shown, is mounted upon the rotary induction coil to which one end of the secondary coil is connected, the said plate or block coöperating with a plurality of distributer points, 12—12, four of which are provided in the device herein illustrated. These distributer points, 12, are preferably formed at the inner ends of metallic sockets, 44, carried by plugs, 45, of insulating material which are screwed or otherwise inserted in suitable openings in the angular portion, 33, of the casing wall and are adapted to receive the terminals of the wires leading to the several igniters and indicated at 27 in the diagram. This distributer is of the jump spark type although I do not limit myself to this form of distributer as the casing may obviously be provided with contact plates or segments, and the rotary parts may be provided with a brush instead of the plate or block, 13, without departing from the invention, both forms of distributer being known.

It will be seen that all of the parts described are contained within the casing, 31, and are supported thereby, the rotary parts being all united for joint rotation with the shaft, 30, and the non-rotary parts being held in fixed relation by the casing. It will also be seen that the casing together with the non-rotary parts connected therewith can be bodily oscillated with respect to the shaft, 30, as for the purpose of advancing or retarding the spark, and for this purpose, I prefer to provide the casing with a timing lever indicated at 46, of usual construction, which may be formed integrally therewith, as shown, or secured thereto in any desired way. I prefer to support the casing in such manner that it may be oscillated, and in Fig. 1 I have shown a housing, 47, adapted to be secured to or forming part of the engine frame, and provided with a bearing recess, 48, in its upper end to receive the extended bearing portion, 37, of the casing which latter is provided with an annular locking groove, 49, adapted to be engaged by a locking screw, 50, extending through the housing, 47, to hold the casing in relation to the housing while permitting the oscillation by means of the timing lever, 46.

The shaft, 30, is adapted to be driven at one half the speed of the crank shaft of the engine, and, in this instance, I have shown the shaft, 30, provided with a bevel gear, 51, meshing with the bevel gear, 52, on a shaft, 53, mounted in the housing, 47, and adapted to be operatively connected with a shaft of the engine to drive the shaft, 30, at the required speed in any usual or preferred manner or the shaft, 30, may be driven in any other desired way.

In Fig. 7 I have illustrated a diagram of the circuit the various parts of the apparatus being indicated by the same reference numerals hereinbefore referred to, and the igniters of the various cylinders of the engine being indicated at 19, while the battery is indicated at 18. The course of the primary circuit through the apparatus will be as follows: The battery, 18, is grounded as indicated at 20 and is connected by a single lead wire, 21, (which extends to the binding post, 60) with the commutator plate, 8, a suitable switch, 61, being provided for controlling the primary circuit. The parts being in the positions indicated in the diagram, current will pass from the commutator plate, 8, to the brush, 11, thence through the separable contacts 3—4, to the brush, 10, and thence to the commutator plate, 9, thence by brush, 22, and screw, 23, to the primary coil, 15, and thence to ground, as illustrated, by wire, 28. When the commutator brushes are in reversed position, obviously the circuit will pass through the contacts, 3 and 4, in the reverse direction and this reversal of circuit occurs twice in each revolution, that is after each two sparks or ignitions.

The condenser, 17, is connected by the wires, 25—26, with the respective separable contacts, as hereinbefore described. The secondary current is grounded through the primary in the usual or any preferred manner, and passes by wire, 62, to the rotary plate or block, 13, thence to distributer points, 12, in succession, and thence by wires, 27, to the several spark plugs, 19, returning through ground in the usual manner. It will be seen that my improved unit can be completely constructed, assembled and electrically connected by the manufacturer at the factory and can be readily mounted upon or in connection with the internal combustion engine. It will also be seen that it is only necessary in installing the apparatus to connect the lead wire, 21, to the binding post, 60, and to connect the four wires, 27, from the distributer points to the respective spark plugs, thus reducing the exterior wiring to a minimum. It will also be seen that all the parts of the apparatus are inclosed and protected by the casing, 31, together with the interior electrical connections while access may be readily had to the contacts of the periodic interrupter, all the rotary parts being united for joint rotation and the non-rotary parts held in fixed relation, and further that by oscillating the casing by means of the timing lever the spark may be advanced or retarded without disturbing the relation of any of the parts of the apparatus.

What I claim and desire to secure by Letters Patent is:

1. A self-contained high tension battery ignition unit comprising among its members a casing member and a separate member, said members being capable of relative rotary movement with respect to each other, an induction coil and condenser within said casing member and secured to one of said members, a periodic interrupter, a commutator for reversing the direction of the current through the contacts of the interrupter, and a distributer within said casing member provided each with rotary parts secured to one of said members, and non-rotary parts secured to the other of said members, said devices within said casing being electrically connected and provided with exterior means for connecting a battery and spark plugs therewith in operative relation.

2. A self-contained high tension battery ignition unit comprising among its members a casing member and a separate member, said members being capable of relative rotary movement with respect to each other, an induction coil and condenser within said casing member and secured to one of said members, a periodic interrupter, a commutator for reversing the direction of the current through the contacts of the interrupter, and a distributer within said casing member provided each with rotary parts secured to one of said members, and non-rotary parts secured to the other of said members, said devices within said casing being electrically connected and provided with exterior means for connecting a battery and spark plugs therewith in operative relation, means for rotating one of said members, and means for oscillating the other of said members concentrically with the axis of rotation of the rotary member.

3. A self-contained high tension battery ignition unit comprising among its members an inclosing casing, a rotatable member within said casing, an induction coil and a condenser secured to and rotatable with said rotatable member, a periodic interrupter and a distributer within said casing, each having a rotatable part connected with said rotatable member and a coöperating part connected with said casing, the rotary part of the periodic interrupter being provided with separable contacts, electrical connections between said contacts and the condenser, carried by said rotatable member, and means for driving said rotatable member.

4. A self-contained high tension battery ignition unit comprising among its members an inclosing casing, a rotatable member within said casing, an induction coil and a condenser secured to and rotatable with said rotatable member, a periodic interrupter and a distributer within said casing, each having a rotatable part connected with said rotatable member, and a coöperating part connected with said casing, the parts carried by the casing being held in fixed relation with each other and with the casing, the rotary part of the periodic interrupter being provided with separable contacts, electrical connections between said contacts and the condenser, carried by said rotatable member, means for driving said rotatable member, means for rotatably supporting said casing and its connected parts, and means for oscillating said casing and all the parts connected therewith about the axis of said rotatable member.

5. A self-contained high tension battery ignition unit comprising among its members an inclosing casing, a rotatable member within said casing, an induction coil and condenser secured to said rotatable member, a periodic interrupter and a distributer within said casing, each having a rotatable part connected with said rotatable member, and a coöperating part connected with said casing, a commutator for periodically reversing the direction of current through the contacts of the interrupter, located within the casing, and provided with rotatable parts connected with said rotatable member, and non-rotatable parts connected with said casing, and means for driving said rotatable member.

6. A self-contained high tension battery ignition unit comprising among its members an inclosing casing, a rotatable member within said casing, an induction coil and a condenser secured to and rotatable with said rotatable member, a periodic interrupter and a distributer within said casing, each having a rotatable part connected with said rotatable member, and a coöperating part connected with said casing, said casing being open at one end and said periodic interrupter being located at the open end of the casing and being provided with separable contacts, electrical connections between said separable contacts and the condenser, carried by said rotatable member, a removable cap for closing the open end of the casing, to expose the periodic interrupter when removed, means independent of any electrical connections for holding said cap in operative position, and means for driving said rotatable member.

7. A self-contained high tension ignition unit comprising an inclosing casing open at one end, a rotatable member within said casing, an induction coil and condenser secured to said rotatable member, a periodic interrupter and a distributer within said casing, each comprising rotatable parts connected with said rotatable member, and non-rotatable parts connected with said casing, said periodic interrupter being located adjacent to the open end of said casing, a commutator for periodically reversing the direction of current through the contact points of the interrupter provided with rotatable parts carried by the rotatable part of the interrupter, and non-rotatable parts, a cap for closing the open end of the casing carrying said non-rotatable parts of the commutator, and means for driving said rotatable member.

8. In a self-contained high tension battery ignition unit, the combination with the casing provided with distributer points adapted to be connected to the igniters of an internal combustion engine, a rotatable member within said casing, an induction coil secured to said rotatable member, a distributer point connected with said rotatable member and coöperating with the distributer points of the casing, a periodic interrupter within said casing provided with a rotatable part connected with said rotatable member, and a non-rotatable part connected with the casing member, said casing being open at one end and the periodic interrupter being located at the open end of the casing, a closing cap for the open end of the casing, an exterior connecting device carried by said cap and adapted to be connected with the battery, electrical connections including brushes and contact plates for establishing connection between said exterior connecting device, the separable contacts and the induction coil, means independent of any electrical connections for holding said cap in operative position, means for driving rotatable member, and timing means for oscillating the casing and all parts connected therewith.

9. In a self-contained high tension battery ignition unit, the combination with a casing provided with distributer points adapted to be connected to the spark plugs of an internal combustion engine, a rotatable member within said casing, and induction coils secured to said rotatable member, a rotatable distributer point connected with said rotatable member, a periodic interrupter within said casing provided with a rotatable part connected with said rotatable member, and a non-rotatable part connected with the casing member, a commutator for periodically reversing the direction of current through the contacts of the interrupter including brushes carried by the rotary part of the interrupter and contact plates secured to the casing, said casing being provided with an exterior connecting device in electrical connection with one of said contact plates for connecting a battery thereto, the other of said contact plates being connected within the casing of the primary winding of the induction coil.

10. A self-contained high tension ignition unit comprising a casing, a rotatable member within the same, an induction coil secured to said rotatable member, a periodic interrupter having a rotatable part secured to said rotatable member adjacent to said coil and provided with separable contacts, and a non-rotatable part secured to said casing, a condenser secured to said rotatable member and interposed between said coil and the rotatable part of the interrupter and electrically connected across the separable contacts thereof, a commutator comprising brushes carried by the rotatable part of the interrupter and connected with the respective separable contacts thereof, and commutator plates connected with the casing for engaging said brushes, means within the casing for connecting one of said plates with the primary winding of the induction coil, an exterior connection, in electrical connection with the other of said plates, for connecting it with the battery, distributer points carried by the casing and provided with ex- 11. A self-contained high tension battery ignition unit comprising a casing, a rotary driving shaft, an induction coil comprising a core, a primary winding and secondary winding located within the casing, said core being operatively connected with said shaft a periodic interrupter provided with separable contacts and having a rotatable part connected with said core and a non-rotatable part connected with said casing, a distributer comprising a rotatable part connected with said core, and a plurality of distributer points connected with said casing and having exterior connections adapted to be electrically connected with the spark plugs, a commutator comprising brushes carried by the rotatable part of the interrupter, and non-rotatable parts connected with said casing, said casing being provided with an exterior connection electrically connected with one of said non-rotatable parts of the commutator, the other of said non-rotatable parts of the commutator being connected to the primary winding of the induction coil.

12. A self-contained high tension battery ignition unit comprising a casing, a rotatable driving shaft, an induction coil comprising a core, a primary winding and secondary winding located within the casing, said core being operatively connected with said shaft, a periodic interrupter having a rotatable part provided with separable contacts connected with said core, and a non-rotatable part connected with said casing, a distributer comprising a rotatable part connected with said core, and a plurality of distributer points connected with said casing and having exterior connections adapted to be electrically connected with the spark plugs, said casing being provided with an exterior connection to be connected with the battery and electrically connected with said interrupter, and a condenser secured to the core of the induction coil adjacent to the periodic interrupter and electrically connected with the separable contacts thereof.

13. A self-contained high tension battery ignition unit comprising a casing, means for rotatably supporting said casing, a driving shaft rotatable with respect to said casing, an induction coil comprising a core, and primary and secondary windings within said casing, said core being operatively connected with said shaft, a periodic interrupter, a distributer, and a commutator within said casing, each having parts operatively connected with said shaft, and non-rotatable parts operatively connected with the casing, means for driving said shaft, and a timing lever connected with said casing.

14. A self-contained high tension battery ignition unit comprising a vertically disposed casing, means for supporting said casing rotatably with respect to its vertical axis, a vertically disposed driving shaft, an induction coil within said casing having a vertically disposed core connected with said shaft and provided with said primary and secondary windings, a periodic interrupter, and a distributer within said casing, each having rotatable parts operatively connected with said shaft, and non-rotatable parts operatively connected with said casing, the said casing being provided with exterior connections in electrical connection with the non-rotatable parts of the distributer, a commutator for reversing the direction of current through the contacts of the interrupter comprising rotary parts operatively connected with said shaft, and non-rotary parts connected with said casing, an exterior connection on the casing electrically connected with a non-rotatable part of the commutator, and means for oscillating said casing with respect to its support to advance or retard the spark.

In testimony whereof I affix my signature.

FRANCIS R. HOYT.